United States Patent
Hutton

(10) Patent No.: US 9,915,376 B2
(45) Date of Patent: Mar. 13, 2018

(54) TAP WITH INTEGRAL BALL VALVE

(71) Applicant: Peter B. Hutton, Houston, TX (US)

(72) Inventor: Peter B. Hutton, Houston, TX (US)

( * ) Notice: Subject to any disclaimer, the term of this patent is extended or adjusted under 35 U.S.C. 154(b) by 0 days.

(21) Appl. No.: 15/027,064

(22) PCT Filed: Oct. 2, 2014

(86) PCT No.: PCT/US2014/058889
§ 371 (c)(1),
(2) Date: Apr. 4, 2016

(87) PCT Pub. No.: WO2015/051167
PCT Pub. Date: Apr. 9, 2015

(65) Prior Publication Data
US 2016/0238157 A1    Aug. 18, 2016

Related U.S. Application Data

(60) Provisional application No. 61/886,387, filed on Oct. 3, 2013, provisional application No. 61/894,642, filed on Oct. 23, 2013.

(51) Int. Cl.
| | |
|---|---|
| F16K 43/00 | (2006.01) |
| F16K 5/06 | (2006.01) |
| F16K 27/06 | (2006.01) |
| F16K 31/60 | (2006.01) |
| G01L 19/00 | (2006.01) |
| G01L 13/00 | (2006.01) |

(52) U.S. Cl.
CPC .............. *F16K 43/00* (2013.01); *F16K 5/06* (2013.01); *F16K 5/0642* (2013.01); *F16K 5/0647* (2013.01); *F16K 27/067* (2013.01); *F16K 31/602* (2013.01); *G01L 19/0015* (2013.01); *G01L 13/00* (2013.01); *Y10T 137/612* (2015.04)

(58) Field of Classification Search
CPC ......... F16K 43/00; F16K 5/06; Y10T 137/612
USPC ........................................ 137/318
See application file for complete search history.

(56) References Cited

U.S. PATENT DOCUMENTS

| | | | |
|---|---|---|---|
| 4,582,089 A | 4/1986 | Nimberger | |
| 4,672,728 A | 6/1987 | Nimberger | |
| 4,920,626 A | 5/1990 | Nimberger | |
| 4,974,308 A | 12/1990 | Nimberger | |
| 5,064,167 A * | 11/1991 | DiPalma | F16K 5/0694 251/214 |
| 5,752,690 A | 5/1998 | Ellett | |
| 6,609,730 B1 | 8/2003 | Hutton | |
| 6,830,069 B2 * | 12/2004 | Shillito et al. | F16K 5/0631 137/613 |
| 6,871,881 B1 | 3/2005 | Hutton | |
| D541,645 S | 5/2007 | Hutton | |
| 7,458,614 B2 | 12/2008 | Hutton | |

(Continued)

FOREIGN PATENT DOCUMENTS

WO    WO-2014087033 A1    6/2014

*Primary Examiner* — Kevin Lee
(74) *Attorney, Agent, or Firm* — Nixon Peabody LLP; Thomas P. Pavelko

(57) ABSTRACT

A valved tap is disclosed comprising a tap body having a through bore from a threaded input end to an output end thereof. A ball valve is positioned in the tap body so as to interrupt the flow of fluid in the through bore. The output end of the tap body comprises a flanged portion connectable to a manifold.

17 Claims, 8 Drawing Sheets

(56) References Cited

U.S. PATENT DOCUMENTS

| | | | |
|---|---|---|---|
| 7,500,581 B2* | 3/2009 | O'Leary et al. | B67B 7/24 222/1 |
| 7,562,907 B2 | 7/2009 | Hutton | |
| D615,617 S | 5/2010 | Hutton | |
| 7,938,453 B2* | 5/2011 | George et al. | G01L 19/003 285/143.1 |
| 2005/0151372 A1* | 7/2005 | Hutton | G01L 19/0007 285/219 |
| 2006/0283433 A1* | 12/2006 | Gerardo | F41B 11/723 124/74 |
| 2013/0200286 A1* | 8/2013 | Eagen | F16K 5/0636 251/315.08 |
| 2013/0240772 A1 | 9/2013 | Lomax | |

\* cited by examiner

TAP WITH INTEGRAL BALL VALVE

CROSS-REFERENCE TO RELATED APPLICATIONS

This application is a 35 U.S.C. § 371, National Stage Application of International Application Serial Number PCT/US2024/058889, filed Oct. 2, 2014; which in turn, claims domestic priority under 35 U.S.C. § 119 (e), of U.S. provisional application Ser. Nos. 61/886,387, filed Oct. 3, 2013 and 61/894,642, filed Oct. 23, 2013; the entire disclosures of which is herein incorporated by reference in their entireties.

FIELD OF THE INVENTION

The invention relates to taps for attaching to a pipeline containing a flowing fluid, such as oil or gas, as a means of connecting the pressure in the pipeline to a measuring instrument, such as a pressure transmitter. Recently, a new class of measuring instruments to measure a differential pressure, have been introduced to the market. These differential pressure transmitters record a high and a low pressure, taken by taps placed upstream and downstream of an orifice plate, placed in the flow in the pipeline. While it is possible to connect the differential pressure transmitters directly to the high and low pressure taps by means of piping and fittings, it has been found beneficial to interpose a manifold between the taps and the transmitter. The manifolds may be unvalved or valved to interrupt or control the flow to the transmitter. However, if maintenance, leaks or damage occurs to the manifold requiring it to be removed, repaired and/or replaced, it is difficult to exchange the manifold without shutting down the flow in the pipeline. This invention provides a valved tap to interrupt the flow through the tap in order to permit installation, removal, maintenance, replacement or repair of downstream equipment, such as piping, fittings, manifolds, transmitters and the like without the need to interrupt fluid flow in the pipeline.

BACKGROUND OF THE INVENTION

Taps for connection to a pipeline are generally known. The taps usually comprise a tap body, one end of which terminates in an NPT thread, and the other end of which is designed to mate with a pressure measuring instrument, a manifold, or an adapter. Indeed, some of these taps were stabilized to transfer some of the stress on the NPT threads to the tap body. Several variations are described in U.S. Pat. Nos. 4,974,308; 6,871,881; 7,562,907, and U.S. D541,645, the disclosures of each of which are herein incorporated by reference. However, none of these taps provide a structure, or permit a method, of interrupting the flow through the tap.

The valved tap of the invention may be used as a replacement for any tap, including the stabilized taps of the prior art noted above, in order to cause the interruption of flow through the tap and facilitate downstream installation, removal, maintenance, replacement or repair of downstream equipment, such as piping, fittings, manifolds, transmitters and the like without the need to interrupt fluid flow in the pipeline.

SUMMARY OF THE INVENTION

The present invention provides a ball valve as an integral part of a tap, thereby providing both a method and apparatus for interrupting the flow through the tap to facilitate downstream installation, removal, maintenance, replacement or repair of downstream equipment, such as piping, fittings, manifolds, transmitters, and the like without the need to interrupt fluid flow in the pipeline.

In the tap of the invention, the ball valve is preferably provided with opposing stems, connectable to handles to open, close, or control fluid flow through the valve. In practice, most installations will permit only the use of one handle due to the close proximity in which the high and low pressure taps are mounted not only I proximity to each other, but also to surrounding equipment, including supporting pipes, mounting brackets and related structure necessary to ultimately mount and secure the differential pressure transmitters. Thus, in actual use, only one of the opposing handles need be used in practice when the tap is installed for use in the field. However, the provision of two, opposing stems, provides the installer the option of connecting the handle at different positions, depending on the installed orientation of the tap to other taps or equipment. The tap of the invention may be provided with two installed handles at the factory, or each, or only one, handle may be provided in a kit with the tap of the invention, such that the positioning of the handle is left entirely to the installer in order to provide the option of positioning the handle on the tap in its actual operative position. Of course, the shape of the handle may be modified from that illustrated without departing from the spirit and scope of the invention.

DETAILED DESCRIPTION OF THE PREFERRED EMBODIMENTS

Figure 8:
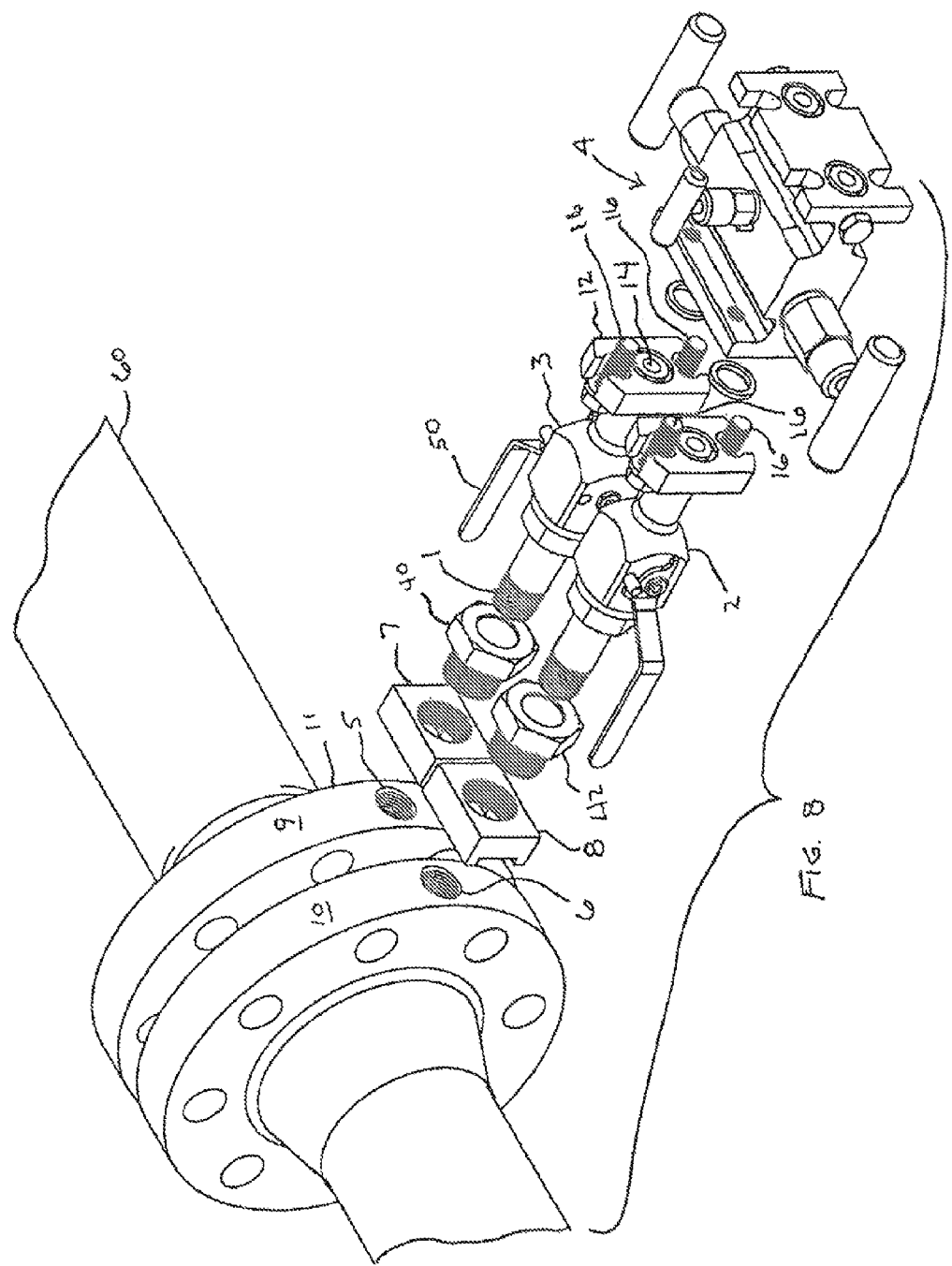

Throughout the specification and drawings, the same numeral will be used to denote the same element. Referring to FIG. 8, there are two taps 2, 3 required for each manifold 4 installation. The taps 2, 3 comprises a male NPT threaded end 1 and a flanged end 12. The flanged end 12 is for attachment to a conventional valved manifold 4. However, it also may be directly connected to an adapter or directly to a pressure measuring device. The male NPT threaded end 1 of taps 2, 3 can be directly threaded into the orifice fittings 5, 6. The same tap 2, 3 can be used with shoes 7, 8 (FIG. 8)

in order to stabilize the taps on the curved surfaces 9, 10 of the pipe flange 11 containing the orifice taps 5, 6 shown in FIG. 8.

Figure 1:
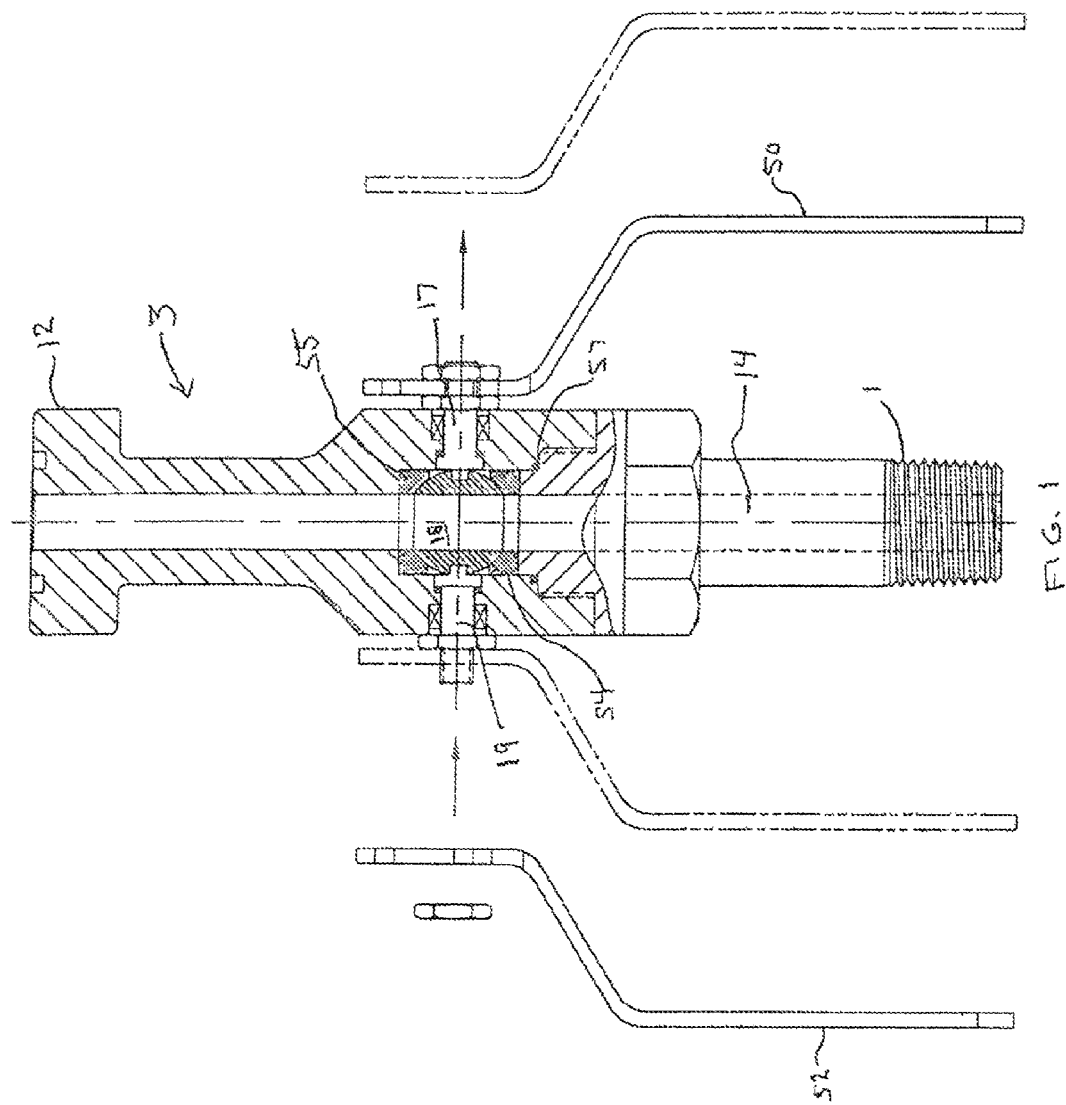
FIG. 1 is a schematic, partially cross-sectional view illustrating the tap of the invention as provided with a ball valve having opposing stems, and at least one handle attached to the stem.
Figure 2:
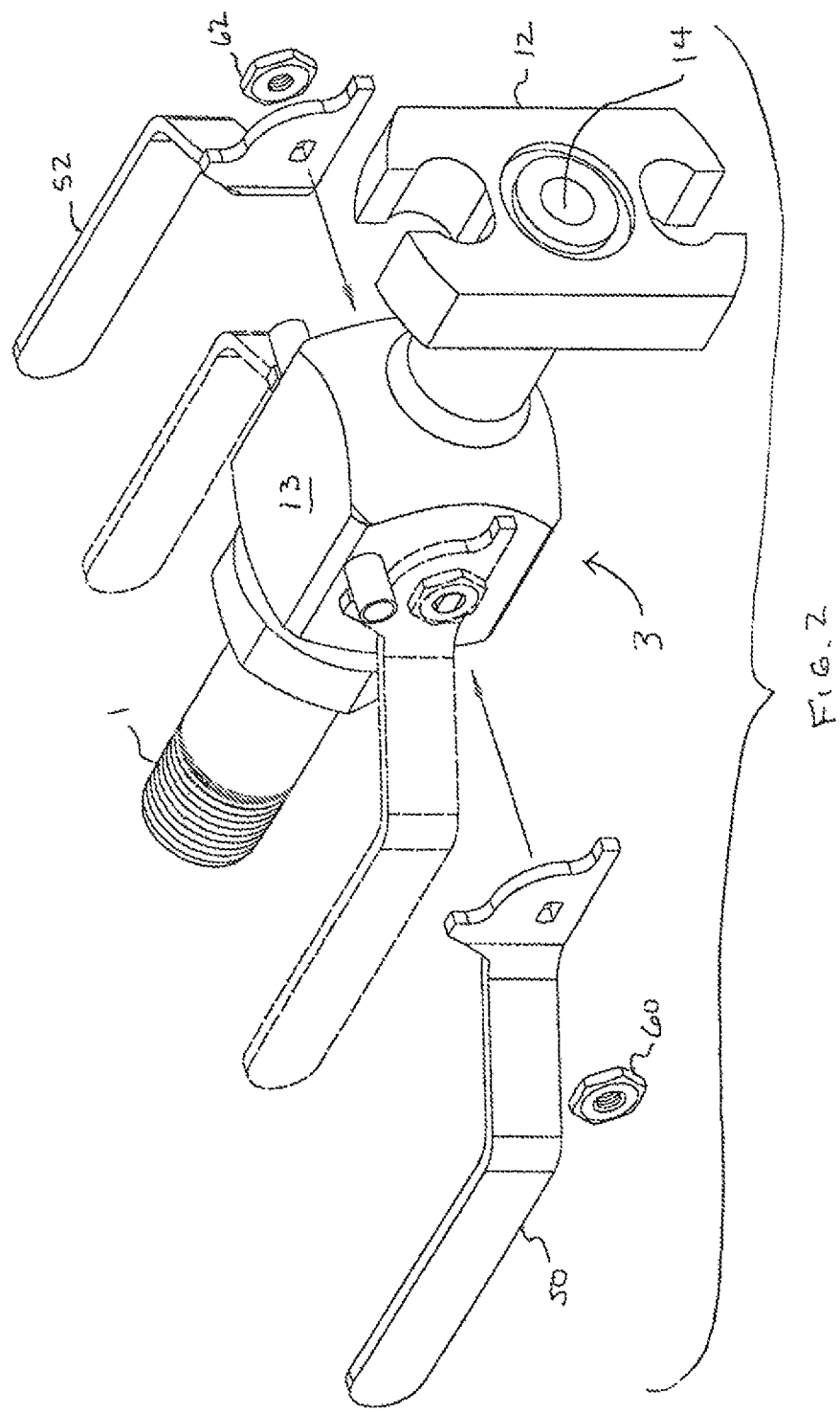
FIG. 2 is a perspective view of the tap of FIG. 1.
Figure 3:
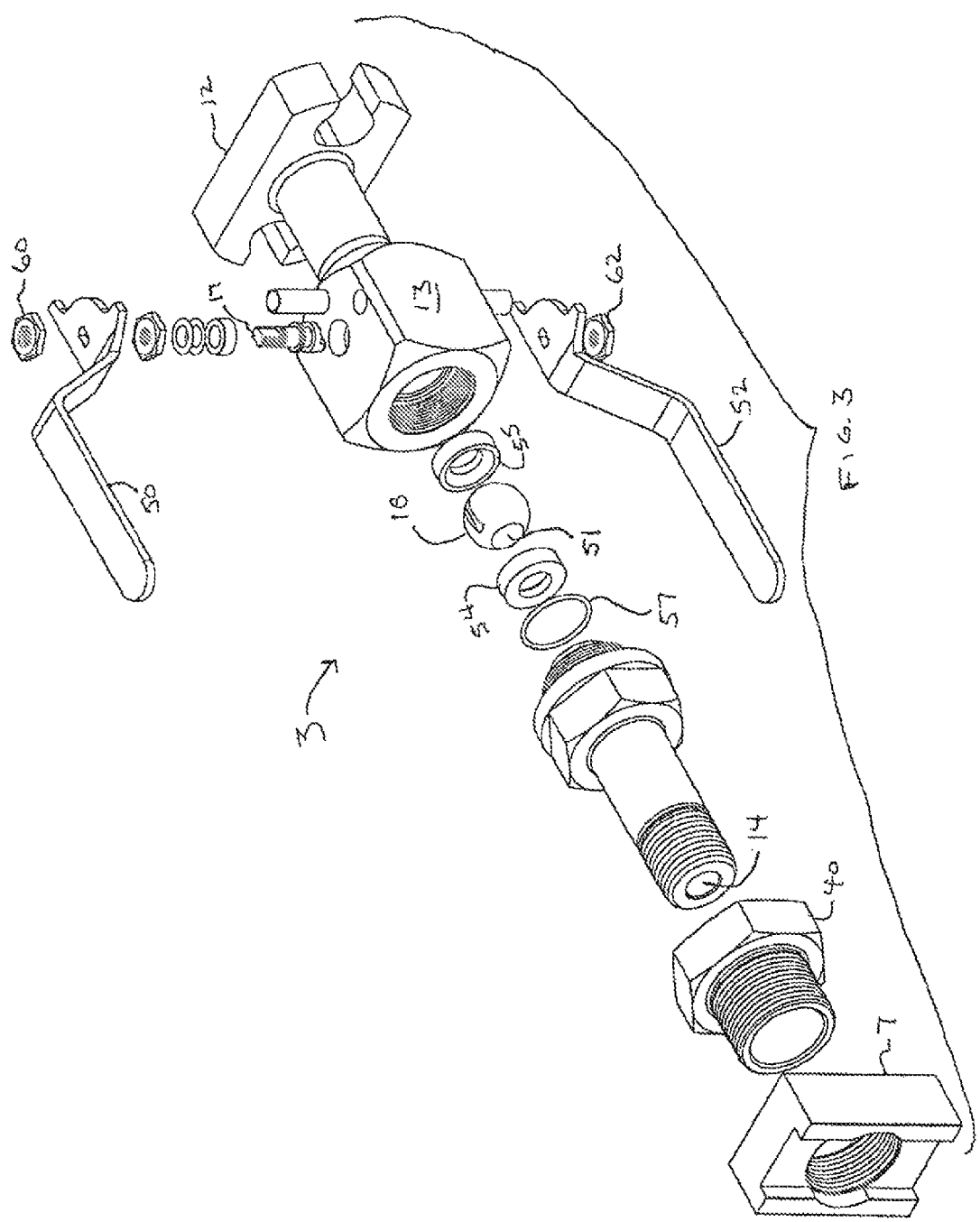
FIG. 3 is an exploded view of the tap of FIG. 2 according to the invention, in combination with one form of stabilizing element.
Figure 4:
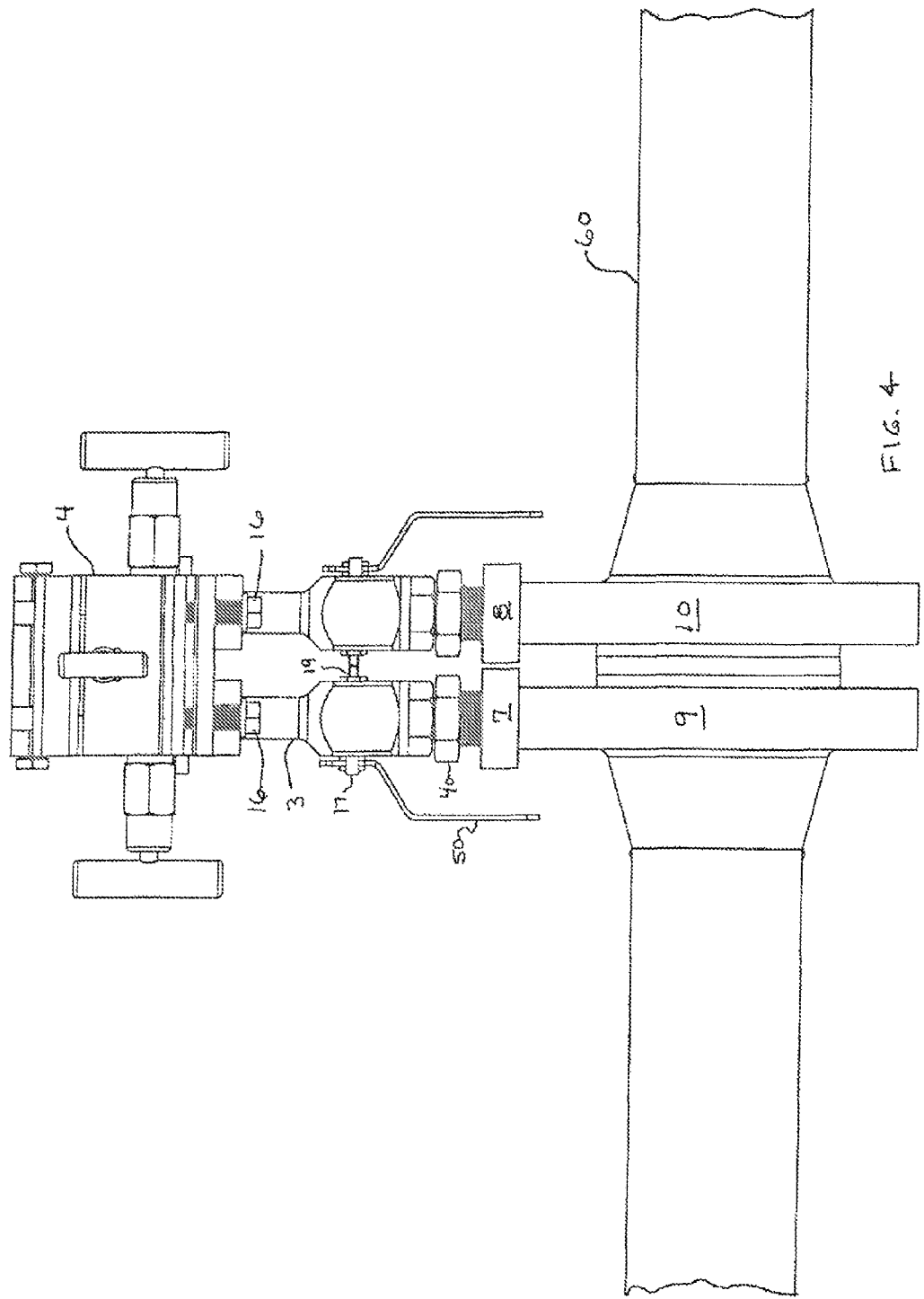
FIG. 4 is a schematic representation of the tap of the invention, installed on a pipeline in a vertical orientation relative to the pipeline and connected to a manifold, and in proximity to a second tap according to the invention.
Figure 5:
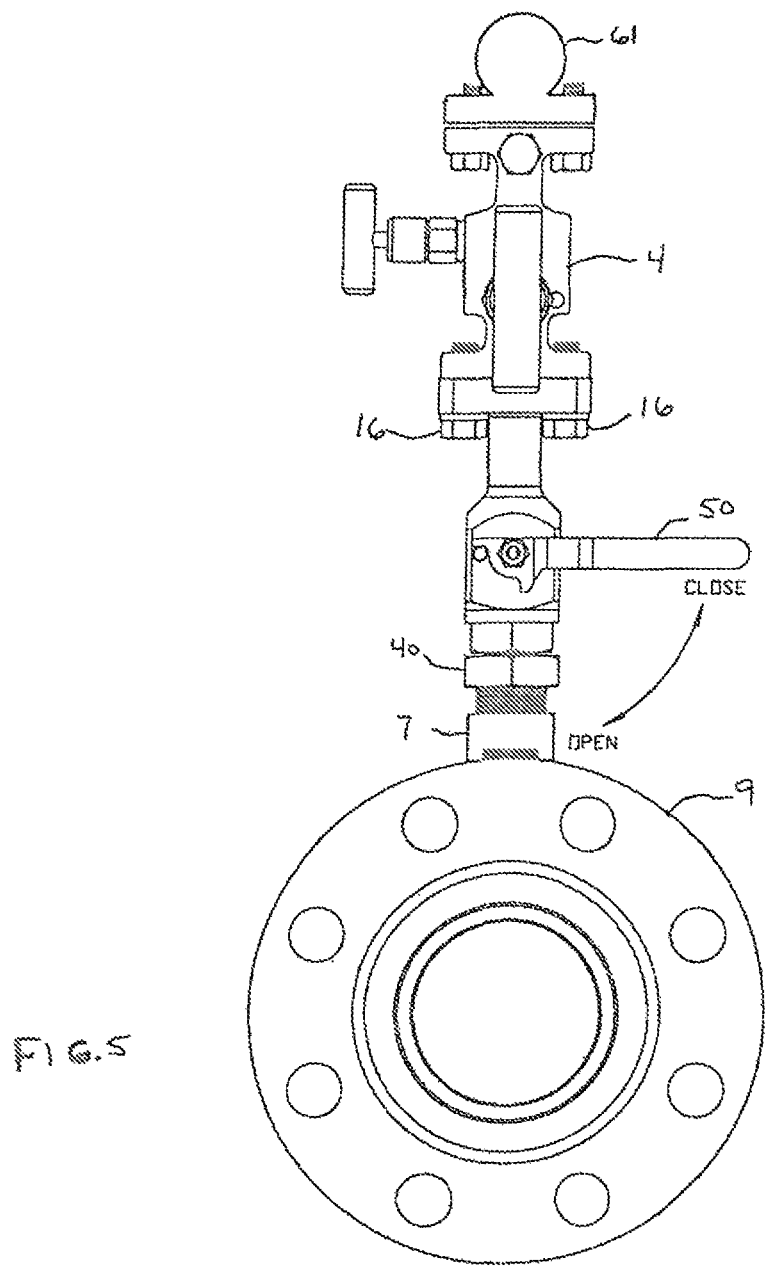
FIG. 5 is a schematic view of the tap of the invention, installed on a flange of a pipeline, showing operation of the handle.
Figure 6:
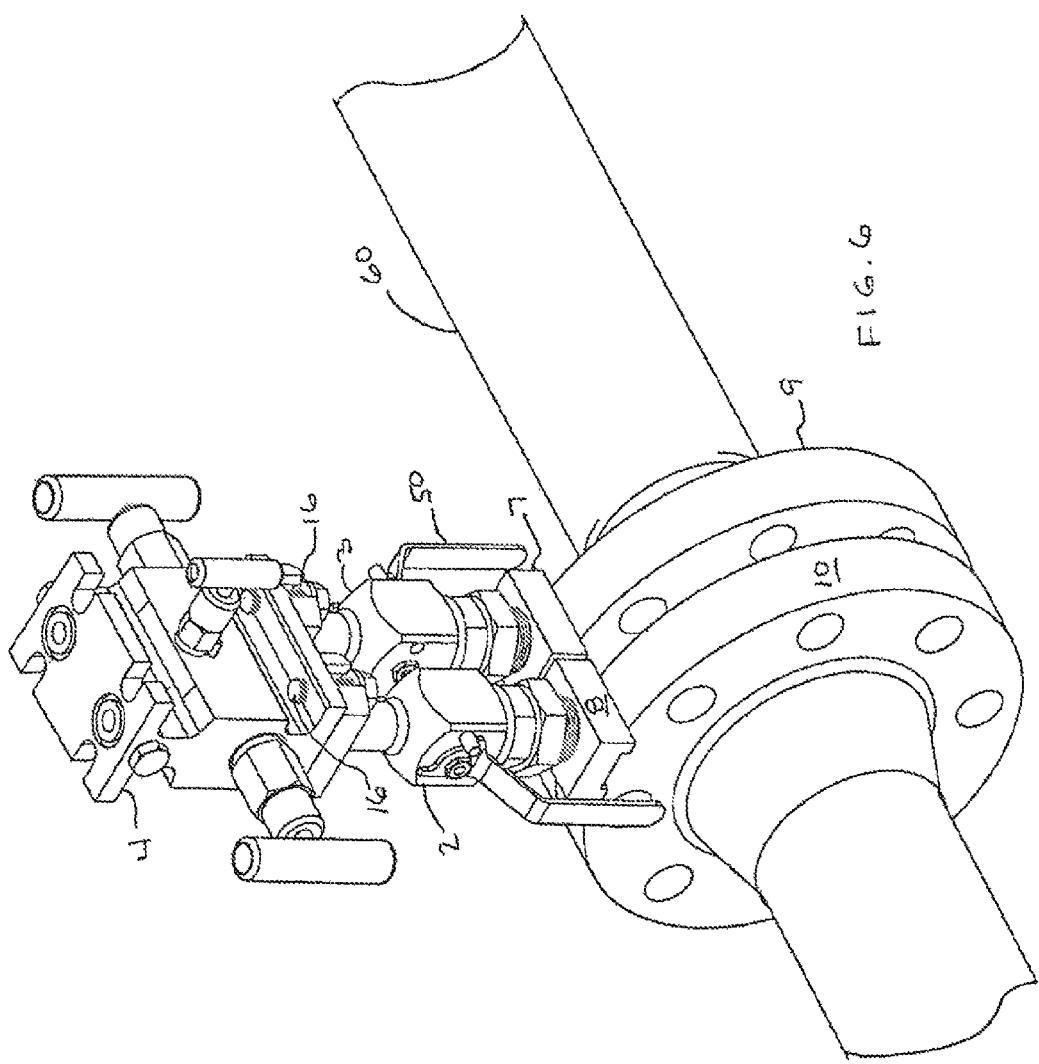
FIG. 6 is a perspective view of FIG. 4.
Figure 7:
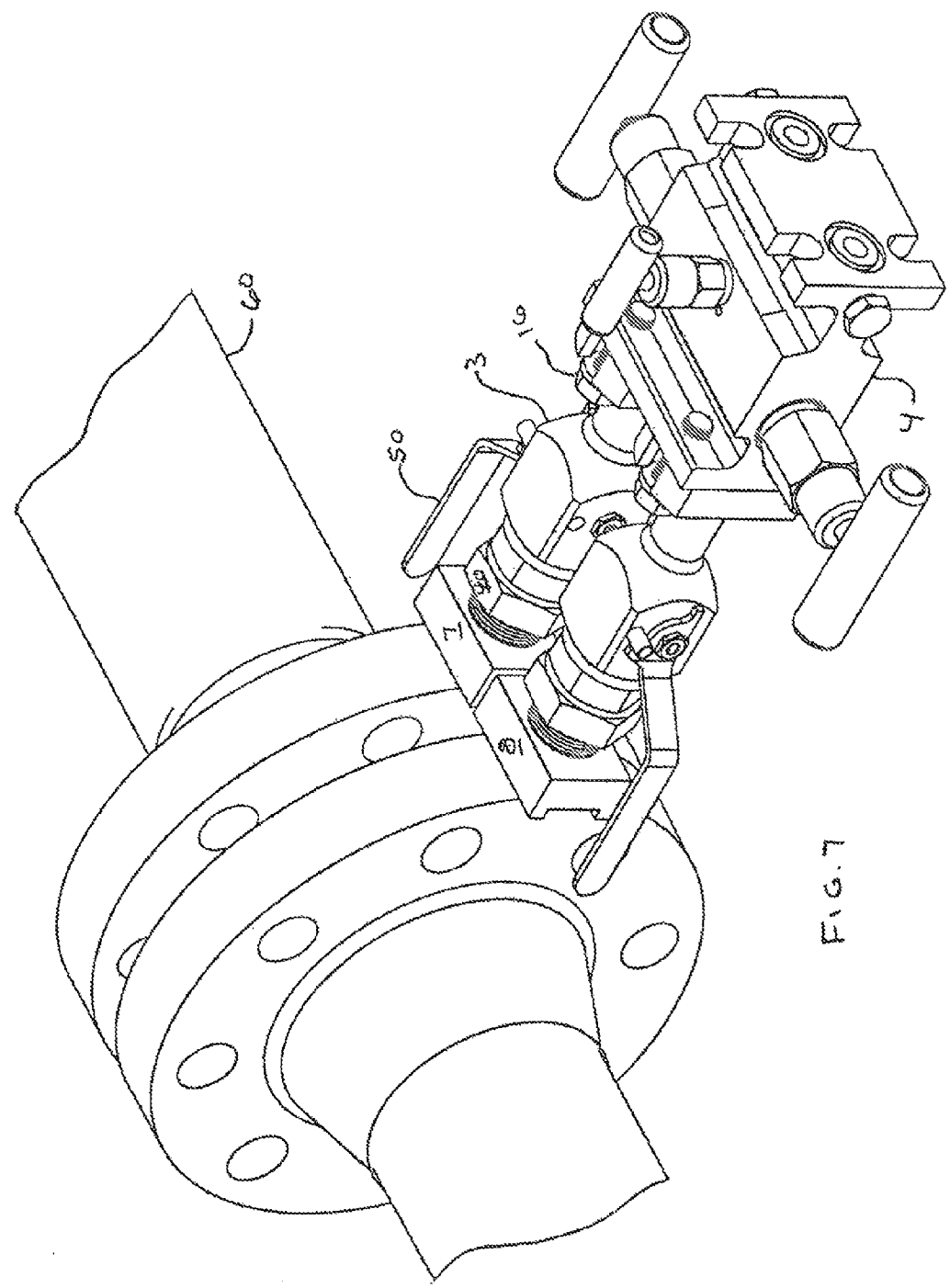
FIG. 7 is a schematic representation of the taps of the invention, installed in a horizontal orientation to a pipeline; and, FIG. 8 is an exploded view of FIG. 7 to further illustrate the details of the connection of the taps of the invention to a pipeline on the NPT end of the tap and to a manifold on a flanged end of the tap.

Turning now to the inventive apparatus of FIG. 1, a tap 3 is provided comprising a tap body 13, the tap body 13 having a through bore 14 therein for communicating the source of pressurized fluid from an orifice fitting 5 (FIG. 8) in a flange 11 to a conventional manifold 4 (FIG. 8). The manifold 4 can be secured to the flange 12 of tap 3 by use of bolts 16 (four of which are shown in FIG. 8). One end of tap body 13 is provided with threads 1, preferably NPT, so as to mate with the threads in orifice fitting 5 in flange 11. The other end of the tap body 13 is provided with a flange 12 for mounting to a conventional manifold 4 in FIG. 8. Interposed in through bore 14 is a ball valve 18 (FIG. 3), which is mounted on opposing stems (one of which 17 is shown in FIG. 3), preferably operated by at least one of opposed handles 50, 52. The provision of opposing stems permits the option of connecting the handle to the stem most conveniently located for operation, taking into account the close proximity of the taps of the invention to another tap, other equipment or supporting structure. Nuts 60, 62, can be provided for securing the handles 50, 52 to the stems 17, 19. It should be here noted, that it is not critical to the invention that both handles 50, 52 are supplied with the tap of the invention, as the ball valve 18 is suitably operable with only one handle. However, the provision of two handles as ac kit with the valved tap of the invention facilitates the installation of the tap in the field, by allowing the installation technician to attach, and/or remove, any handle which is in too close in proximity to adjacent structure or equipment, including another tap. This is illustrated in FIGS. 4 and 6-8. Of course, the ball valve 18 could be operated with both handles 50, 52 (FIG. 3), with handles of different design, or even with the handles removed so long as the force operating on at least one of the stems 17, 19 can rotate the ball valve 18 within its seat 54, 55. Seal 57, preferably formed of a high temperature material, such as GRAFOIL™ is provided to prevent leakage. Of course, as the ball valve 18 rotates, the fluid flowing through the bore 51 in the ball 18 can be regulated to the point of complete interruption of flow. In such a condition, the manifold 4, and/or any other downstream equipment, such as a pressure transmitter 61, FIG. 5 can be serviced, replaced, or repaired without interrupting the fluid flow in the pipeline 60.

As in the earlier patents referenced above, the tap body 13 may be provided with means to transfer the load from the NPT threads 1 to the body of the tap. One such manner is by use of the combined nut/sleeve 40, 42 (FIGS. 3 and 8) in combination with shoes 7, 8. Additionally, other manners of transferring the load from the NPT threads 1 to the tap body 13 as shown, for example in my U.S. Pat. Nos. 6,871,881; 7,458,614, or U.S. D541,645, or others, may be employed in connection with the claimed invention.

The invention finds particular utility in pipeline transmission of fluids, especially in the oil and gas industry, but those skilled in the art, having studied the disclosure in connection with the appended drawings, may readily envision other fields of use.

As many possible embodiments may be made of the invention without departing from the scope thereof, it is to be understood that all matter herein set forth or shown in the accompanying drawings is to be interpreted as illustrative, and not in a limiting sense.

I claim:

1. A valved tap for attaching to at least one of an oil or gas pipeline, said tap comprising:

a unitary tap body; said tap body having a fluid input end and a fluid output end, the fluid input end further comprising a tap, the tap comprising a male set of NPT threads to couple said valved tap to said at least one of an oil or gas pipeline and the fluid output end of the tap body comprising a manifold mating flange;

a through bore through the tap body; said through bore extending from the input end to the flange; said through bore providing a fluid communication channel from the tap through the flange;

a ball being provided within said unitary tap body and positioned in said fluid communication channel; said ball being provided with opposing stems; said stems aligned on an axis and mounted in the tap body, said ball further defining a bore therein; whereby rotation of the ball about the axis will bring the bore of said ball into or out of fluid communication with said through bore, the ball thereby acting as a valve to intermittently place the fluid input end and fluid output end in fluid communication or out of fluid communication with the at least one of the oil and gas pipeline and where the ball is positioned in a seat; the seat fitting within said unitary tap body between the input end and the flange of the tap body.

2. The valved tap of claim 1, wherein each of the opposing stems exits the valve body.

3. The valved tap of claim 2, wherein at least one handle is mounted on one of the opposing stems.

4. The valved tap of claim 2, wherein a handle is mounted on each one of the opposing stems.

5. The valved tap of claim 2, further comprising a shoe.

6. The valved tap of claim 5, further comprising a combined nut and sleeve to transfer a load from the NPT threads to the body of the tap.

7. The valved tap of claim 1, wherein the ball rotates within a seat comprising a temperature resistant material to resist leakage.

8. The valved tap of claim 1, wherein the ball and the opposed stems are separable from each other.

9. The valved tap of claim 8, wherein the ball further comprises a groove into which a flattened portion of at least one of the opposed stems fits to facilitate rotation of the ball.

10. The valved tap of claim 7, wherein the temperature resistant material is GRAFOIL™.

11. A method of connecting a pressure tap between a source of fluid pressure in at least one of said oil or gas pipeline and a manifold comprising installing the valved tap of claim 1 between the source of fluid pressure in at least one of said oil and gas pipeline and the manifold.

12. The method of claim 11, further comprising installing a pressure sensing instrument on the manifold.

13. The method of claim 12, wherein the step of installing the pressure sensing instrument on the manifold comprises installing a differential pressure transmitter on the manifold.

14. A method of installing a pair of valved taps on adjacent flanges of at least one of an oil or gas pipeline, an orifice plate intermediate the flanges creating a differential pressure measured at the flanges of the pipeline, the method comprising providing two of the valved taps according to claim 1; said two of said valved taps comprising a first valved tap and a second valved tap; installing the first valved tap on a first flange of the adjacent flanges; installing the second valved tap on a second flange of the adjacent flanges; said first valved tap and said second valved tap being installed such that the axis of the opposed stems of each of the first valved tap and the second valved tap lie on a common axis.

15. The method of claim 14, further comprising the step of installing at least one handle on at least one of the opposed stems of at least one of the valved taps from the group consisting of the first valved tap and the second valved tap.

16. The method of claim 14, further comprising threading the NPT threads of each of the first and second valved taps into the adjacent flanges of the at least one of the oil or gas pipeline such that their respective flanges of the first and second valved taps mate with a single manifold placed in contact with each of the respective flanges of the first and second valved taps.

17. A valved tap for attaching to at least one of an oil or gas pipeline, said tap comprising:
- a unitary tap body; said tap body having a fluid input end and a fluid output end, the fluid input end further comprising a tap, the tap comprising a male set of NPT threads to couple said valved tap to said at least one of an oil or gas pipeline and the fluid output end of the tap body comprising a flange;
- a through bore through the tap body; said through bore extending from the input end to the flange; said through bore providing a fluid communication channel from the tap through the flange;
- a ball being provided within said unitary tap body and positioned in said fluid communication channel; said ball being provided with opposing stems; wherein each of the opposing stems exits the valve body, said stems aligned on an axis and mounted in the tap body, said ball further defining a bore therein; whereby rotation of the ball about the axis will bring the bore of said ball into or out of fluid communication with said through bore, the ball thereby acting as a valve to intermittently place the fluid input end and fluid output end in fluid communication or out of fluid communication with the at least one of the oil and gas pipeline and where the ball is positioned in a seat; the seat fitting within said unitary tap body between the input end and the flange of the tap body, the valved tap further comprising a combined nut and sleeve to transfer a load from the NPT threads to the body of the tap, the valved tap further comprising a shoe, wherein the sleeve comprises an external surface which is threaded and the shoe defines an internal surface which is threaded to mate with the threads on the external surface of the sleeve.

* * * * *